Dec. 6, 1960 — C. L. SHARP — 2,963,038
VALVE WITH UNITARILY REMOVABLE HEAD AND SEAT
Filed Nov. 18, 1957

INVENTOR.
CHESTER L. SHARP
BY
ATTORNEY

United States Patent Office 2,963,038
Patented Dec. 6, 1960

2,963,038
VALVE WITH UNITARILY REMOVABLE HEAD AND SEAT

Chester L. Sharp, Tulsa, Okla., assignor, by mesne assignments, to National Tank Company, Tulsa, Okla., a corporation of Nevada Filed Nov. 18, 1957, Ser. No. 697,129

2 Claims. (Cl. 137—454.6)

This invention relates generally to improvements in valves, and more particularly, but not by way of limitation, to an improved valve construction wherein all of the working parts of the valve may be removed as a unit.

As it is well known in the art, flow control valves ordinarily have the valve seat rigidly secured to the valve body, and the valve stem guided by either another portion of the valve body or a closure member rigidly secured on another portion of the valve body. With this type of construction, any contortion of the valve body, such as occurs when the valve is used in high temperature service, causes a misalignment of the valve head and the valve seat. Such misalignment is frequently encountered in the larger sizes of valve structures, since the valve body for this type of valve will ordinarily be made out of forged steel or some other metal having a high coefficient of expansion. In addition, when the valves are disassembled for repair or replacement of the working parts, the valve stem and head are removed separately from the valve seat, requiring the handling of a large number of separate parts, and frequently requiring the use of special tools for removing the valve seat.

The present invention contemplates a novel valve construction wherein a unitary structure separate from the valve body is used to guide the valve head movement and hold the valve seat, thus maintaining the valve head in precise alignment with the valve seat and providing an even seating of the valve head on the seat each time the valve is closed. The unitary structure guiding the valve head and holding the seat is inserted in the valve body in such a manner that contortion of the valve body will have no effect on the alignment of the valve head and seat; therefore, the valve body may be formed out of an economical metal. The present invention also contemplates a unitary valve guide and seat holding structure such that the valve seat and the valve head are removed together from the valve body by a simple outward pull on the valve stem. Thus, when any working part of the valve becomes worn, the valve head and seat may be removed and replaced in a minimum of time and with a minimum handling of separate parts.

An important object of this invention is to provide a valve construction wherein the valve head will be retained in precise alignment with the valve seat in all operating positions of the valve to assure an even seating of the head on the seat.

Another object of this invention is to facilitate repair of valves.

A further object of this invention is to provide a valve construction wherein the valve head and seat are carried by a unit separate from the valve body, and alignment of the valve head and seat will be unaffected by contortion of the valve body.

A still further object of this invention is to provide a valve construction wherein the valve head and seat are removed together when disassembling the valve.

Another object of this invention is to provide a valve construction requiring no special tools for completely disassembling the valve.

Another object of this invention is to provide a simply constructed valve having a long service life and which may be economically manufactured.

Other objects and advantages of the invention will be evident from the following detailed description, when read in conjunction with the accompanying drawings which illustrate my invention.

Figures 1, 2:
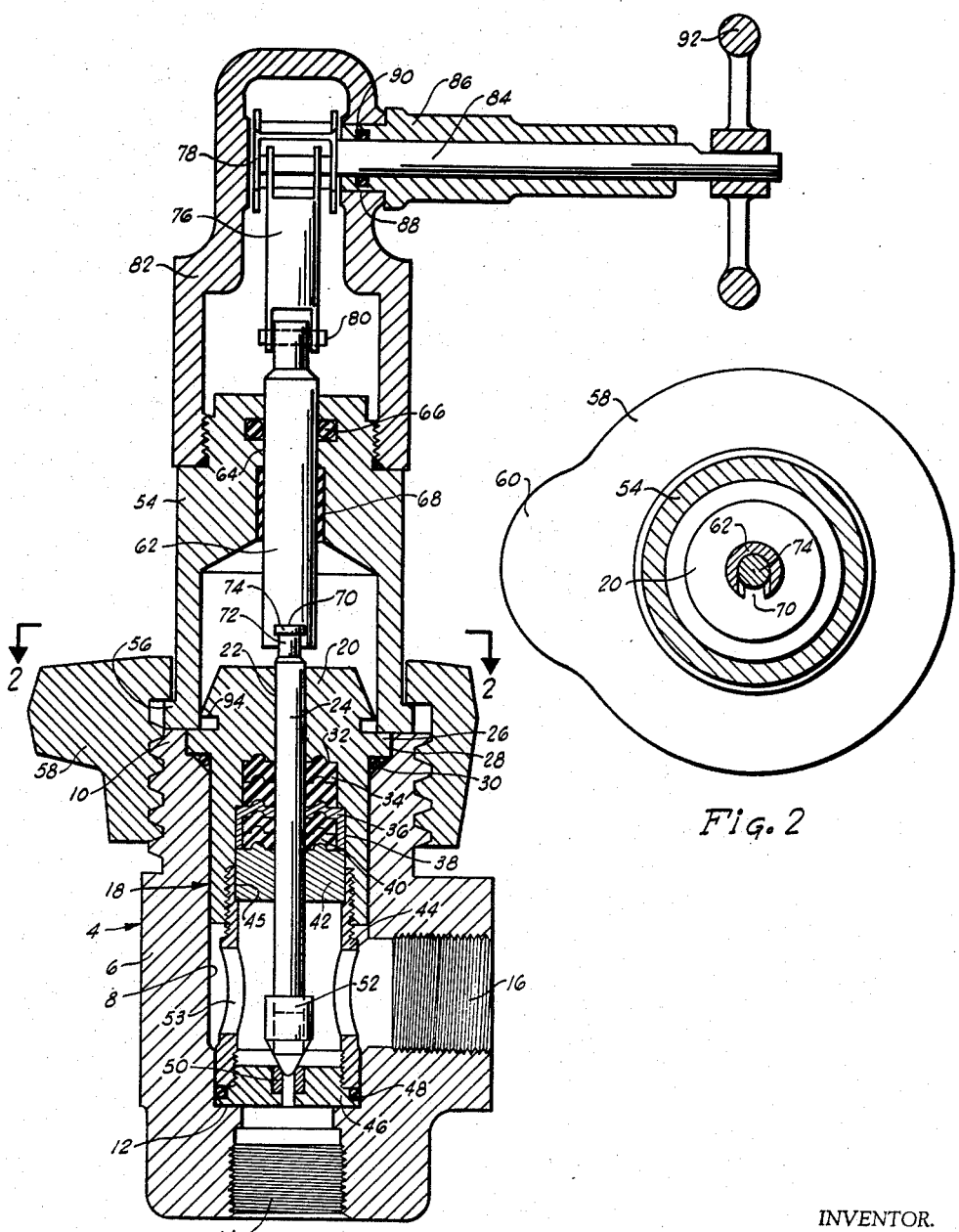
Figure 1 is a vertical sectional view through a valve constructed in accordance with this invention.
Figure 2 is a transverse sectional view of the valve as taken along lines 2—2 of Fig. 1.

Referring to the drawings in detail, reference character 4 generally designates a novel valve which includes an elongated valve body 6 having a bore 8 extending from the upper end 10 of the body 6 to a point 12 in proximity with the lower end of the body. A threaded inlet 14 is provided in the lower end of the valve body 6 and extends into communication with the lower end of the bore 8. It is preferred that the inlet 14 be formed concentrically with the bore 8. A threaded outlet 16 extends through one side of the body 6 into communication with the bore 8 a short distance above the inlet 14. The bore 8 forms the valve chamber for the valve 4 and receives a combination tubular guide and valve seat holding assembly generally designated by reference character 18.

The assembly 18 is of a length to extend from the lower end 12 of the bore 8 through the upper end 10 of the body 6, and has an outer diameter of a size to provide a relatively loose sliding fit of the assembly in the bore 8. It will be observed that the lower end portions of the bore 8 and the assembly 18 are reduced in diameter in the embodiment shown, however, the bore 8 and the assembly 18 may be of uniform diameter if desired. The upper or outer end portion 20 of the assembly 18 comprises a guide having a bore 22 extending longitudinally therethrough to form a reduced diameter portion of the inner diameter of the assembly 18 and to slidingly receive a valve stem 24. An outwardly extending circumferential flange 26 is formed around the guide 20 and is of a size to mate with a counter-bore 28 in the upper end of the valve body 6. A suitable sealing ring 30 is provided around the guide 20 immediately below the flange 26 to engage the body 6 and prevent flow of fluid upwardly around the assembly 18, as will be more fully hereinafter set forth.

A counter-bore 32 is provided in the guide 20 at the lower or inner end of the bore 22 to receive a pair of packing rings 34 extending around the valve stem 24. The packing rings 34 may take any desired form to provide an effective seal between the outer periphery of the valve stem 24 and the walls of the counter-bore 32. A retaining ring 36 is provided in a second counter-bore 38 in the guide 20 at the lower end of the counter-bore 32 to retain the packing rings 34 in operating position. The retaining ring 36 is hollow to receive additional packing rings 40. A combination bushing and retainer ring 42 is inserted in the lower end portion of the counter-bore 38 to retain all of the packing rings 34 and 40 and the retainer ring 36 in their operating positions and form an additional guide for the stem 24. Thus, the member 42 should be formed out of a bearing material, such as brass. A sleeve 44 is threaded into the lower end of the guide 20 and has a counter-bore 45 in the upper end thereof to receive the lower end portion of the ring 42. Thus, when the sleeve 44 is threaded all the way into guide 20, the ring 42 will be contacted by the lower end of the counter-bore 45 and urged upwardly to wedge the packing rings 34 and 40 around the valve stem 24.

The sleeve 44 extends from the guide 20 to the lower end 12 of the valve chamber 8 and has an annular shaped seat holding member or plate 46 threadedly secured in the lower end thereof. The plate 46 is sealed around its outer periphery to the walls of the valve chamber 8 by a suitable sealing ring 48. A valve seat 50 is secured in the upper face of the plate 46 to receive the valve head 52 on the lower end of the valve stem 24. The seat 50 may be secured in the plate 46 in any desired manner, such as by brazing. It may also be observed that the head 52 has a diameter greater than the diameter of the bore 22 through the guide 20, as well as a diameter greater than the inner diameter of the ring 42, in order that the valve stem 24 cannot be withdrawn from the assembly 18 upwardly through the bore 22 when the head 52 is secured on the lower end of the valve stem. The detailed construction of the valve head 52 forms no part of the present invention and will therefore not be described in detail herein. A plurality of transverse ports 53 are provided in the medial portion of the sleeve 44 to provide communication between the seat 50 and the outlet 16.

A tubular bonnet 54 is disposed above the upper end 10 of the valve body 6 and has an outwardly extending circumferential flange 56 on the lower end thereof. The flange 56 rests on the upper end 10 of the body 6 and is engaged by a hammer nut 58 threaded onto the upper end 10 of the valve body. The hammer nut 58 (see Fig. 2) has the usual projection 60 on one side thereof for being contacted by a hammer to unthread the nut 58 from the body 6. It will also be observed (Fig. 1) that the inner diameter of the bonnet 54, at the lower end of the bonnet, is less than the diameter of the flange 26 on the upper end portion of the assembly 18, whereby the lower end of the bonnet 54 contacts the upper face of the flange 26 when the bonnet 54 is secured on the body 6 to retain the assembly 18 in the valve chamber 8.

An auxiliary stem 62 extends through a reduced diameter bore 64 in the upper end of the bonnet 54. The bore 64 has suitable packing 66 therein around the stem 62 to prevent leakage around the stem. The bore 64 also contains a bushing 68 of a size to slidingly receive the auxiliary stem 62 and guide the stem in its vertical movement, as will be more fully hereinafter set forth. A T-shaped slot 70 (see also Fig. 2) is cut in the lower end of the auxiliary stem 62 and extends from one side of the stem through slightly more than one-half the diameter of the stem. The upper end 72 of the valve stem 24 is reduced in diameter to mate with the lower portion of the T-shaped slot 70, and a head 74 is formed on the upper end of the reduced portion 72 to fit in the large portion of the T-shaped slot 70. Thus, the valve stem 24 is securely connected to the auxiliary stem 62 in order that vertical movement of the auxiliary stem 62 will be imparted to the valve stem 24. However, the valve stem 24 may be easily disconnected from the auxiliary stem 62 by sliding the head 74 and reduced portion 72 out of the end of the T-shaped slot 70, as will be more fully hereinafter set forth.

The auxiliary stem 62 may be reciprocated by any desired operating mechanism, such as a diaphragm (not shown) or a rod 76 extending downwardly from a toggle 78. The rod 76 may be pivotally secured to the upper end of the auxiliary stem 62 by a transversely extending pin 80, such that a swinging movement of the rod 76 will not be imparted to the auxiliary stem 62. The toggle 78 is enclosed by a suitable cap or housing 82 threadedly secured on the upper end of the bonnet 54, and is secured on the inner end of a transversely extending shaft 84. The shaft 84 extends through one side of the cap 82 and is supported in a suitable extension or bushing 86. The bushing 86 is secured in a bore 88 in the side of the cap 82 and preferably contains a sealing ring 90 providing a seal around the transverse shaft 84. A suitable handle 92 is secured on the outer end of the shaft 84 for turning the shaft 84 and operating the toggle 78.

In assembling the valve 4, the packing rings 34 and 40, and the retainer rings 36 and 42 are inserted in the counter-bores 32 and 38 of the guide 20, and then the stem 24, with the head 52 on the lower end thereof, is inserted through the ring 42 upwardly through the bore 22 of the guide 20. The sleeve 44, with the plate 46 and seat 50 in the lower end thereof, is then threaded into the lower end of the guide 20 over the head 52 to complete the assembly 18. With the sealing rings 30 and 48 in place around the assembly 18, the assembly 18 is inserted through the upper end of the valve chamber 8 until the plate 46 contacts the lower end 12 of the valve chamber. The auxiliary stem 62 may then be moved to its lowermost position in the bonnet 54 and the valve stem 24 pulled upwardly through the assembly 18 to facilitate connection of the auxiliary stem 62 to the valve stem 24. This connection is accomplished by inserting the head 74 and extension 72 of the valve stem 24 into the T-shaped slot 70 in the lower end of the auxiliary stem 62. The bonnet 54 is then secured on the upper end 10 of the body 6 by the hammer nut 58. The cap 82 and operating mechanism may be assembled on the bonnet 54 and connected to the upper end of the auxiliary stem 62 either before or after the bonnet 54 is secured on the valve body 6.

In operation, the handle 92 is turned in opposite directions to reciprocate the auxiliary stem 62 through the medium of the shaft 84, toggle 78, rod 76 and pin 80. The movement of the auxiliary stem 62 will be transmitted to the valve stem 24, as previously indicated, to move the valve head 52 toward and away from the valve seat 50 and open and close the valve 4. It is to be observed that the valve stem 24 is guided only by the bore 22 of the guide 20 and the lower retaining ring or bushing 42. The stem 24 has no direct contact with any portion of the valve body 6. Furthermore, since the assembly 18 fits loosely in the valve chamber 8, any contortion of the valve body 6 will not be transmitted to the valve stem 24 where it would cause a misalignment of the valve head 52 with the valve seat 50. Therefore, the valve body 6 may be formed out of a relatively cheap material, such as forged steel, having a relatively high coefficient of expansion, even when the valve 4 is used in controlling the flow of a high temperature fluid. It is preferred that the guide 20, sleeve 44 and plate 46 be formed out of a material having a low coefficient of expansion, such as stainless steel, in order that variations in temperature of the fluid flowing through the valve 4 will not affect the alignment of the valve 52 and seat 50. The valve stem 24 should also be formed out of a material having a low coefficient of expansion.

In disassembling the valve 4, as when it is desired to repair or replace the working parts, the bonnet 54 is simply disconnected from the valve body 6 by unthreading the hammer nut 58, and the auxiliary stem 62 is slipped off of the head 74 of the valve stem 24. The assembly 18 will then be free to move vertically out of the valve chamber 8, without the use of any special tools. When the assembly 18 is removed, it will be observed that both the valve head 52 and the valve seat 50 are removed. The assembly 18 may be removed either by pulling upwardly on the valve stem 24, or by gripping a head portion 94 formed on the upper end of the guide 20. When the valve stem 24 is pulled upwardly, the head 52 will contact the ring 42 and transmit the movement of the valve stem 24 to the entire assembly 18.

After removal of the assembly 18, the plate 46 may be unthreaded from the lower end of the sleeve 44 for replacement of the valve seat 50 and the valve head 52 may be removed from the lower end of the valve stem 24 for separate replacement of the working parts. However, in a commercial operation, the entire assembly 18 is replaced as a unit to minimize the handling of a large number of separate parts in the field and assure precise alignment of the valve head 52 and valve seat 50.

From the foregoing it will be apparent that the present invention provides a novel valve construction which may be easily repaired. All of the working parts of the valve are removed as a unit, and without the use of special tools, to provide repair or replacement of the working parts in a minimum of time. It will also be apparent that the valve head and the valve seat will be maintained in precise alignment to provide an even seating of the head on the seat even though the valve is used in a high temperature service. Any contortion of the valve body will not be transmitted to the valve stem to misalign the valve head and seat. It will be further apparent that the present valve construction is simple, will have a long service life and may be economically manufactured.

Changes may be made in the combination and arrangement of parts or elements as heretofore set forth in the specification and shown in the drawings, it being understood that changes may be made in the precise embodiment shown without departing from the spirit and scope of the invention as defined in the following claims.

I claim:

1. A valve comprising;

a body having a bore extending from one end thereof partially through the body to form a valve chamber, said body having an inlet in the opposite end thereof communicating with the inner end of the valve chamber and an outlet through one side thereof communicating with an intermediate portion of the valve chamber;
a tubular guide and seat holding assembly in the valve chamber of a length to extend from said one end of the body to the inner end of the valve chamber and having an outer diameter of a size to provide a loose sliding fit of the assembly in the valve chamber comprising,
  (a) a sleeve of metal having a low coefficient of expansion and sized to fit slidingly in the inner end portion of the valve chamber and formed with a plurality of transverse ports in its medial portion,
  (b) a seat holding member of metal having a low coefficient of expansion and secured on the inner end of the sleeve,
  (c) and a tubular guide member of metal having a low coefficient of expansion and threadedly joined to the outer end of the sleeve out of the path of fluid flow through the valve, the inner diameter of the guide at the inner end thereof being of the size to loosely receive a valve head and the inner diameter of the guide being reduced in the outer end portion of the guide to slidingly receeive a valve stem;
a valve stem slidingly extending through the reduced inner diameter portion of the assembly;
packing rings in the assembly around the valve stem outwardly of said transverse ports;
a valve head on the inner end of the valve stem having a diameter greater than the reduced inner diameter portion of the guide;
a valve seat in the seat holding member receiving the valve head;
seals around the assembly on opposite sides of the sleeve ports;
a bonnet secured on said one end of the body in contact with the outer end of the assembly to anchor the assembly in the valve chamber;
an auxiliary stem attachably secured to the outer end of said valve stem and slidingly extending through the bonnet;
and means for reciprocating the auxiliary stem to move the valve head toward and away from said seat and control the flow of fluid from the inlet to the outlet.

2. A valve comprising;

a body with a bore extending from one end of the body partially through the body to form a valve chamber, the body having an inlet in the opposite end which communicates with the inner end of the valve chamber and an outlet through one side of the chamber to communicate with an intermediate portion of the valve chamber;
a tubular guide and seat holding assembly positioned in the valve chamber and of a length to extend from the one end of the body to the inner end of the valve chamber and having an outer diameter sized to provide a loose sliding fit of the assembly within the valve chamber comprising,
  (a) a tubular guide member within the chamber and having its inner diameter at the inner end sized to loosely receive a valve head while the inner diameter of the guide is reduced in the outer end portion to slidingly receive a valve stem,
  (b) a sleeve sized to slidingly fit in the inner end portion of the valve chamber and formed with a plurality of transverse ports in its medial portion and threadedly joined to the inner end of the tubular guide member,
  (c) and a seat holding member secured on the inner end of the sleeve;
a valve stem slidingly extending through the reduced inner diameter portion of the assembly;
packing rings in the assembly around the valve stem outwardly of the transverse ports;
a valve head on the inner end of the valve stem having a diameter greater than the reduced inner diameter portion of the guide;
a valve seat in the seat holding member receiving the valve head;
seals around the assembly on the opposite sides of the sleeve ports;
a bonnet secured on one end of the body in contact with the outer end of the assembly to anchor the assembly in the valve chamber;
an auxiliary stem attachably secured to the outer end of the valve stem and slidingly extending through the bonnet;
and means for reciprocating the auxiliary stem to move the valve head toward and away from the seat and control the flow of fluid between the inlet and the outlet.

References Cited in the file of this patent

UNITED STATES PATENTS

| | | |
|---|---|---|
| 925,679 | Bonfield | June 22, 1909 |
| 951,407 | Moore | Mar. 8, 1910 |
| 1,379,389 | Brassington | May 24, 1921 |
| 1,493,409 | Wiley | May 6, 1924 |
| 1,494,543 | Hazeltine | May 20, 1924 |
| 1,899,846 | Boyd | Feb. 28, 1933 |
| 2,223,567 | Kersten | Dec. 3, 1940 |
| 2,508,843 | Semak | May 23, 1950 |
| 2,732,166 | Rayner | Jan. 24, 1956 |
| 2,856,961 | Kruschik | Sept. 21, 1958 |